Patented Dec. 2, 1947

2,431,880

UNITED STATES PATENT OFFICE 2,431,880

PREPARATION OF SULFURYL CHLORIDE

August Merz, East Orange, N. J., assignor to American Cyanamid Company, New York, N. Y., a corporation of Maine No Drawing. Application May 24, 1941, Serial No. 394,995

4 Claims. (Cl. 23—203)

This invention relates to a process for the manufacture of sulfuryl chloride and in particular to the preparation of sulfuryl chloride from alkali metal chlorosulfonates, alkaline-earth metal chlorosulfonates, and magnesium chlorosulfonates.

It has been proposed in the past to prepare sulfuryl chloride catalytically by passing equivalent proportions of sulfur dioxide and chloride gases through activated carbon at a low temperature. This process, however, requires the determination of the correct proportions of sulfur dioxide and chlorine and as the reaction is strongly exothermic it is necessary to maintain it at a low temperature.

The present invention provides an economical source of sulfuryl chloride by the evolution of molecular equivalent amounts of sulfur dioxide and chlorine by heating an alkali metal chlorosulfonate, an alkaline-earth metal chlorosulfonate, or a magnesium chlorosulfonate. The sulfur dioxide and chlorine gases are combined, under cooling, as sulfuryl chloride in the presence of a catalyst such as activated carbon and are condensed.

In the process of this invention activated carbon is the preferred catalyst in the interaction of the sulfur dioxide and chlorine gases but other catalysts, such as camphor, may be employed.

Sodium chlorosulfonate is the preferred intermediate used and may be prepared conveniently by the reaction of sulfur trioxide with sodium chloride. Sodium chlorosulfonate prepared from chlorosulfonic acid and sodium chloride may also be used in the preparation of sulfuryl chloride by the process of this invention. Instead of sodium chlorosulfonate other chlorosulfonates may be used as a source of sulfur dioxide and chlorine gases. Examples of such other chlorosulfonates are potassium chlorosulfonate, calcium chlorosulfonate, and magnesium chlorosulfonate.

The advantages of the process of the present invention are that the alkali metal chlorosulfonate, alkaline-earth metal chlorosulfonate, or magnesium chlorosulfonate provides an inexpensive and convenient source of sulfur dioxide and chlorine and when the chlorosulfonate, such as sodium chlorosulfonate, is subjected to the proper heating these gases are automatically evolved in the correct proportion to unite as sulfuryl chloride.

It is found that improved yields are obtained when the reaction vessel is one in which no metal is exposed to attack by the reaction materials. A carbon lining provides a satisfactory and preferred lining for such a vessel. The material or the lining of the reaction vessel may be any which is satisfactory for the reaction and which resists the action of the reaction mixture.

The following examples are given to illustrate the invention. They do not in any way limit its scope.

Example 1

A charge of sodium chlorosulfonate, made from dried, powdered, sodium chloride and sulfur trioxide containing sulfuric acid converter gas, is placed in an externally heated retort and it is slowly heated up to 400° C. over a period of 4 to 5 hours. The $SO_2$ and $Cl_2$ gases evolved are led to a water jacketed chamber containing granular activated carbon. The gases combine as $SO_2Cl_2$ and are condensed and the liquid is collected in a suitable receiver. A typical analysis of the residue left in the retort is 5.6% acidity expressed as $SO_3$ and 1.5% NaCl.

Example 2

The process of Example 1 is followed, but substituting calcium chlorosulfonate for sodium chlorosulfonate. The liquid $SO_2Cl_2$ is obtained in substantially the same yield as from sodium chlorosulfonate.

What I claim is:

1. A method for preparing sulfuryl chloride which comprises heating a chlorosulfonate included in the group consisting of alkali metal and alkaline-earth metal and magnesium chlorosulfonate, bringing the sulfur dioxide and chlorine gases evolved from said heating into contact with a catalyst and condensing the sulfuryl chloride thus produced.

2. A method according to claim 1 in which the catalyst is a cooled column of activated carbon.

3. A method according to claim 1 in which the chlorosulfonate is heated to a temperature of about 400° C. over a period of four to five hours.

4. A method according to claim 1 in which the chlorosulfonate is sodium chlorosulfonate.

AUGUST MERZ.

REFERENCES CITED

The following references are of record in the file of this patent:

UNITED STATES PATENTS

| Number | Name | Date |
| --- | --- | --- |
| 2,254,041 | Laury | Aug. 26, 1941 |
| 1,765,688 | McKee et al. | June 24, 1930 |
| 1,364,738 | Durrans | Jan. 4, 1921 |
| 1,536,708 | Gorke | May 5, 1925 |
| 2,208,517 | Prutton | July 16, 1940 |
| 2,259,248 | Iler | Oct. 14, 1941 |

FOREIGN PATENTS

| Number | Country | Date |
| --- | --- | --- |
| 347,644 | Great Britain | Jan. 31, 1929 |

OTHER REFERENCES

"Inorganic and Theoretical Chemistry," by Mellor; Longmans, Green & Co., New York, N. Y., vol. 10 (1930), pp. 688 and 689.